(12) United States Patent
Ross et al.

(10) Patent No.: US 9,558,463 B2
(45) Date of Patent: Jan. 31, 2017

(54) IN-FIELD DEVICE FOR DE-CENTRALIZED WORKFLOW AUTOMATION

(71) Applicant: RAF TECHNOLOGY, INC., Redmond, WA (US)

(72) Inventors: David Justin Ross, Redmond, WA (US); Bryan J. Turner, Redmond, WA (US); Christopher Traina, Redmond, WA (US); George Harbachuk, Redmond, WA (US); Diego Saavedra, Redmond, WA (US); Richard Clark Teudt, Redmond, WA (US); Kevin Saur, Redmond, WA (US)

(73) Assignee: RAF Technology, Inc, Redmond, WA (US)

( * ) Notice: Subject to any disclaimer, the term of this patent is extended or adjusted under 35 U.S.C. 154(b) by 0 days.

(21) Appl. No.: 14/465,690

(22) Filed: Aug. 21, 2014

(65) Prior Publication Data

US 2015/0025932 A1    Jan. 22, 2015

Related U.S. Application Data

(63) Continuation of application No. 13/628,654, filed on Sep. 27, 2012, now Pat. No. 9,361,596.
(Continued)

(51) Int. Cl.
G06K 9/18 (2006.01)
G06Q 10/06 (2012.01)
(Continued)

(52) U.S. Cl.
CPC ............. *G06Q 10/0633* (2013.01); *B07C 3/10* (2013.01); *G06K 9/20* (2013.01); *G06Q 50/28* (2013.01)

(58) Field of Classification Search
None
See application file for complete search history.

(56) References Cited

U.S. PATENT DOCUMENTS 4,921,107 A    5/1990  Hofer
5,031,223 A    7/1991  Rosenbaum
(Continued)

FOREIGN PATENT DOCUMENTS

EP    0759596 A2    2/1997
EP    2478463 A1    7/2012
(Continued)

OTHER PUBLICATIONS

United States Postal Service Publication 28 "Postal Addressing Standards" dated Jul. 2008; text plus Appendix A only; 55 pages.
(Continued)

*Primary Examiner* — Sumati Lefkowitz
*Assistant Examiner* — David Perlman
(74) *Attorney, Agent, or Firm* — Schwabe, Williamson & Wyatt, PC (57) ABSTRACT

In one example, a system is provided. The system includes a portable, in-field unit including: a tag reader to acquire an ID tag identifier from a tag located in or on a physical item positioned within functional range of the in-field unit tag reader; a digital processor arranged for executing software code stored in the in-field unit responsive to the acquired ID tag identifier, the stored software code including—a customer application layer; and a database adapter component configured to provide database services to the processor; wherein the database services include accessing a stored database to acquire stored data associated with the acquired ID tag identifier.

23 Claims, 5 Drawing Sheets

Related U.S. Application Data (60) Provisional application No. 61/543,243, filed on Oct. 4, 2011, provisional application No. 61/543,264, filed on Oct. 4, 2011.

(51) Int. Cl.
  *G06K 9/20* (2006.01)
  *G06Q 50/28* (2012.01)
  *B07C 3/10* (2006.01)

(56) References Cited

U.S. PATENT DOCUMENTS

| | | | |
|---|---|---|---|
| 5,079,714 A | 1/1992 | Manduley | |
| 5,422,821 A | 6/1995 | Allen | |
| 5,457,636 A | 10/1995 | Sansone | |
| 5,514,863 A | 5/1996 | Williams | |
| 5,518,122 A | 5/1996 | Tilles | |
| 5,703,783 A | 12/1997 | Allen | |
| 5,734,568 A | 3/1998 | Borgendale | |
| 5,745,590 A | 4/1998 | Pollard | |
| 5,923,848 A | 7/1999 | Goodhand | |
| 6,246,794 B1 | 6/2001 | Kagehiro | |
| 6,292,709 B1 | 9/2001 | Uhl | |
| 6,327,373 B1 | 12/2001 | Yura | |
| 6,343,327 B2 | 1/2002 | Daniels, Jr. | |
| 6,360,001 B1 | 3/2002 | Berger | |
| 6,370,259 B1 | 4/2002 | Hobson | |
| 6,434,601 B1 | 8/2002 | Rollins | |
| 6,470,091 B2 | 10/2002 | Koga | |
| 6,539,098 B1 | 3/2003 | Baker | |
| 6,549,892 B1 | 4/2003 | Sansone | |
| 6,697,500 B2 | 2/2004 | Woolston | |
| 6,741,724 B1 | 5/2004 | Bruce | |
| 6,768,810 B2 | 7/2004 | Emanuelsson | |
| 6,816,602 B2 | 11/2004 | Coffelt | |
| 6,826,548 B2 | 11/2004 | Hungerpiller | |
| 6,829,369 B2 | 12/2004 | Poulin | |
| 6,985,926 B1 | 1/2006 | Ferlauto | |
| 7,121,458 B2 | 10/2006 | Avant | |
| 7,171,049 B2 | 1/2007 | Snapp | |
| 7,204,415 B2 | 4/2007 | Payne | |
| 7,518,080 B2 | 4/2009 | Amato | |
| 7,834,289 B2 | 11/2010 | Orbke | |
| 8,086,344 B1 * | 12/2011 | Mishra et al. | 700/216 |
| 8,374,390 B2 | 2/2013 | Stroila | |
| 8,527,086 B2 | 9/2013 | Elmenhurst | |
| 2001/0010334 A1 | 8/2001 | Park | |
| 2001/0014164 A1 | 8/2001 | Daniels | |
| 2001/0021261 A1 | 9/2001 | Koga | |
| 2002/0122569 A1 | 9/2002 | Coffelt | |
| 2002/0168090 A1 | 11/2002 | Bruce | |
| 2002/0172399 A1 | 11/2002 | Poulin | |
| 2003/0044044 A1 | 3/2003 | Emanuelsson | |
| 2003/0046103 A1 | 3/2003 | Amato | |
| 2003/0169900 A1 | 9/2003 | Woolston | |
| 2003/0182018 A1 | 9/2003 | Snapp | |
| 2003/0236709 A1 | 12/2003 | Hendra | |
| 2004/0065598 A1 | 4/2004 | Ross | |
| 2004/0175038 A1 | 9/2004 | Bonner | |
| 2004/0202154 A1 * | 10/2004 | Aklepi et al. | 370/352 |
| 2005/0006469 A1 | 1/2005 | Nonneman | |
| 2005/0108111 A1 | 5/2005 | Kranyec | |
| 2005/0119786 A1 | 6/2005 | Kadaba | |
| 2005/0125217 A1 * | 6/2005 | Mazor | G06F 17/273 704/1 |
| 2005/0137991 A1 | 6/2005 | Bruce | |
| 2005/0197966 A1 | 9/2005 | Payne | |
| 2005/0251285 A1 | 11/2005 | Boyce | |
| 2006/0030969 A1 | 2/2006 | Norris | |
| 2006/0080306 A1 | 4/2006 | Land | |
| 2006/0138223 A1 | 6/2006 | Schar | |
| 2006/0144937 A1 | 7/2006 | Heilper | |
| 2008/0130947 A1 | 6/2008 | Ross | |
| 2008/0294474 A1 | 11/2008 | Furka | |
| 2009/0045924 A1 | 2/2009 | Roberts, Sr. | |
| 2009/0057207 A1 | 3/2009 | Orbke | |
| 2009/0222354 A1 * | 9/2009 | Murphy | G06Q 10/087 705/21 |
| 2010/0153291 A1 | 6/2010 | Jimenez | |
| 2010/0324724 A1 | 12/2010 | Elmenhurst | |
| 2011/0033083 A1 | 2/2011 | Sipe | |
| 2012/0030103 A1 * | 2/2012 | Hughes | G06Q 10/00 705/41 |
| 2012/0182588 A1 * | 7/2012 | Mampe | G07B 17/0008 358/3.28 |
| 2013/0022284 A1 | 1/2013 | Zheng | |
| 2013/0084010 A1 | 4/2013 | Ross | |

FOREIGN PATENT DOCUMENTS

| | | |
|---|---|---|
| JP | 61-234481 A | 10/1986 |
| WO | 02093323 A2 | 11/2002 |
| WO | 03061857 A2 | 7/2003 |
| WO | 2010151575 A1 | 12/2010 |

OTHER PUBLICATIONS

NCOA Link at http://ribbs.usps.gov/ncoalink/ncoalink_print.htm; dated May 27, 2009; 3 pages.

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

Stolowitz Ford Cowger LLP List of Related Matters dated May 12, 2015; 1 page.

European Search Report; EP application No. 12187251; dated Oct. 14, 2014; 3 pages.

* cited by examiner

FIG. 1
APPLICATION WORK FLOW
(CURRENT ADDRESS VERIFICATION DELIVERY PROCESS)

FIG. 2 mobile software stack

FIG. 3 simplified example of system

IN-FIELD DEVICE FOR DE-CENTRALIZED WORKFLOW AUTOMATION

PRIORITY

This application is a continuation of U.S. Non-provisional application Ser. No. 13/628,654 filed on Sep. 27, 2012, which issued on Jun. 7, 2016 as U.S. Pat. No. 9,361,596, entitled: IN-FIELD DEVICE FOR DE-CENTRALIZED WORKFLOW AUTOMATION, which is a non-provisional of U.S. Provisional Application No. 61/543,243 filed on Oct. 4, 2011, entitled: MOBILE AND KIOSK DEVICES FOR DE-CENTRALIZED WORKFLOW AUTOMATION, and U.S. Provisional Application No. 61/543,264 filed on Oct. 4, 2011, entitled: MOBILE ELECTRONIC DATA CAPTURE AND RECOGNITION, each of which are incorporated by reference herein in their entirety.

BACKGROUND

Many courier, express, and Postal ("CEP") companies rely on electronic data interchange to capture and link unique barcodes with customer destination addresses in order to automate their track & trace and sortation systems which are required for operational efficiency and on-time delivery commitments. Electronic data interchange (EDI) is the structured transmission of data between organizations by electronic means. It is used to transfer electronic documents or business data from one computer system to another computer system.

Figure 1:
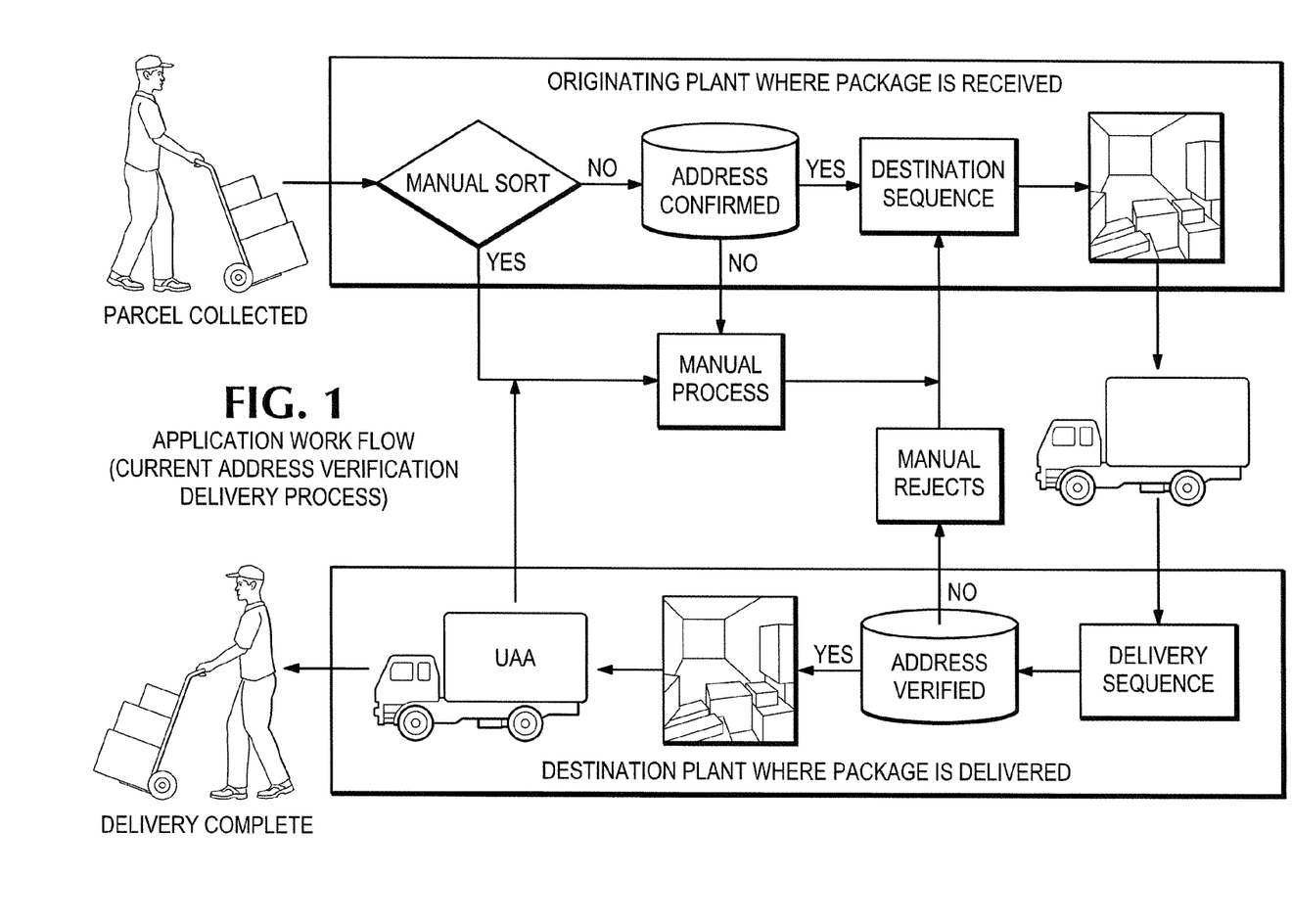
FIG. 1 illustrates a prior art address verification and delivery process.

For many CEP companies, there is an ongoing challenge to capture and link this vital information prior to collection and induction of parcels into their network. According to a Gartner study published in 2009, fewer than 25% of the total number of transportation/delivery companies had implemented some level of automated EDI capture. And of those companies, the range of EDI information available at induction can vary between 50% to 99%. This current situation has a huge impact on daily operational cost and can negatively impact customer service because many of these non-automated parcels where EDI information is missing requires manual processing which can impact delivery timelines. FIG. 1 represents a typical CEP workflow which illustrates both automated and manual processes.

Currently, all parcels that are missing critical EDI data must be rerouted from an automated sortation system for manual processing. Manual processing of these parcels can take anywhere from 10 seconds, to 10 minutes per parcel. For example: Assuming it would take a person 5 minutes on average to manually link EDI information on a parcel, and the depot received 300 parcels that require manual processing within a 4 hour window, the carrier would have to assign 7 people to manually process all 300 parcels for next day delivery.

SUMMARY OF THE INVENTION

Embodiments of the present disclosure provide an unprecedented opportunity for courier, express, and Postal ("CEP") companies to increase successful automated EDI rates by automatically linking missing barcode and destination addresses data. Utilizing mobile OCR technology with intelligent directory services, a parcel address label can be processed at the sender location (e.g. scanned by a ruggedized mobile computer and the address data is then extracted and verified on the handset.) This local extraction and verification process provides the following benefits:

Address and barcode data can be read instantaneously in one simple scan transaction Address errors automatically detected and corrected Provides customized outputs from multiple data sources (e.g. add GPS coordinates to the address data)

No over the air (OTA) network connection is required to process a transaction

In one scenario the disclosure may be applied in an in-field device, e.g. a portable, mobile unit to be carried by an agent who picks up parcels in the field, and collects them for delivery to an originating "plant" for processing and routing toward their destination. Key data may be acquired before the parcels even reach the plant.

In another scenario, parcels received at a plant (or receiving depot) may be processed by an agent using a similar in-field device. Using an embodiment of the disclosure, one operator could process on the order of 300 parcels in less than 2 hours. Then the parcels are dispatched toward the destination, with destination addresses already confirmed.

The economic benefit from this new technology is significant for carriers. In addition to providing benefit in the CEP industry, in-field capture and recognition of destination related data can also be applied for applications in warehousing, transportation, field service, and Government. Example use cases include reading and verifying license plates, Driver's license, Passports, identification cards, manufacture service tags, parts, and other types of forms processing such as invoices used for Bill of lading or CN-22 customs forms.

Additional aspects and advantages of this invention will be apparent from the following detailed description of preferred embodiments, which proceeds with reference to the accompanying drawings.

DETAILED DESCRIPTION

The primary idea is to take existing technology (such as RAF Technology, Inc.'s address recognition products and capabilities), merge it with in-field decentralized capture technology, e.g. mobile or kiosk-based decentralized capture technology, and create a more natural, optimized process flow by doing so. If you transport a package to a central hub just so you can read its address and induct the package into the transshipment process, you have changed its normal flow (from origin to destination) solely to allow "automation" of the process. If, on the other hand, you capture the information in the field at, say, the point of pickup of the package, you capture the same data, automate the same process, but do it in a way that does not change the natural movement of the object.

A major concept in this document is that injecting automation (in-field devices such as mobile or other devices including kiosk devices) into a work flow without requiring change to that work flow (though it may enable its optimization) enables the less technologically savvy to use technology in an appropriate place in the process, without having to understand how the technology works or even how the process proceeds. By merging capture technology (e.g. OCR, RFID, etc.) with mobility, we are putting information at humans' fingertips exactly where it is first needed in the process. This has two consequences. First, it enables machines to augment a human-centric process rather than the other way around.

Particularly in the first improvement described below, there exists a manual process (which may be part of a larger process that is manual or partially automated) that has a flow that is natural to the way humans work. We enable that human-centric processing flow to be maintained and optimized by adding technology at an appropriate point (usually as early as possible in the process). The addition of the technology may allow optimization of the human-centric flow, but does not require modification of that flow away from its human-centric origins.

Thus, for example, being able to take a package and determine it is to be delivered to the office next door can be done by the courier reading the delivery address (so he can then deliver the package next door without taking it first to a centralized point). But it can be done more easily (and enhance the human courier's brain by "knowing" a wider range of "next door" addresses) if done at the point of pickup by a mobile device used to read the address and determine whether it is "local".

The opposite of this—humans augmenting a machine process—would be, for example, video encoding when a mail piece address cannot be read by the OCR machine. Thus in this case the only reason a human is in the process at all is to aid and backup the "automated" machine process when it fails. What we are proposing is the opposite—extending the ways a machine can support a human-centric process without requiring their modification.

The second consequence of putting information-collecting technology as early as possible in the process flow (through the combination of mobile/kiosk devices and our capture technology) is making more parts of the process accessible to optimization. Thus if a package's size, weight, and destination are captured when a courier picks up the package, the down-stream process typically has upwards of half a day (before the package makes it back to the routing hub) to optimally determine which truck/train/airplane the package should go on, taking into account the size, weight, and destination of the package. That optimal routing can begin immediately.

The Data Capture Automation Enhancement (discussed below) and the Optimal Location of Process Components Enhancement (discussed below) are meant to be used in the increasingly important self-service industry (where people handle for themselves processes that were formerly centralized), but they are not limited to those industries.

Data Capture Automation Enhancement

This concept combines mobile capture technology (hardware) with recognition/authentication/verification technology (software) to take the capture process to the object whose data is being captured rather than to have to take the object to the process. This operates in two separate, but related ways. First it takes a manual process that has a natural flow to it and, by injecting capture technology into the process as early as possible, enables the automation and possible optimization of the process without requiring a fundamental change in the process flow.

Second, it enables the restoration of an already-automated process to its natural flow when the flow required to automate the process has been discordant with the natural flow of the process. The changes enabled by this concept enable three things: the process remains automated, the automation moves further upstream, and the process can be optimized better as a result.

In some embodiments, the change enabled by our combining of mobile hardware capture with recognition/authentication/verification software, results in a process that no longer requires aggregation at a central point where the aggregation was solely required by the automation process. In other words, there exists a natural manual process flow. That flow historically was disrupted and changed, sometimes drastically, by the requirements of the automation. That automation, nevertheless, gives sufficient benefit that the resulting automated process is now more efficient than the original manual one. The present concept allows a restoration of the natural flow of the process while keeping or extending the automation of the process, allowing automation to proceed further upstream, and also to allow further optimization of the now-restructured process.

When centralized aggregation of processed items was solely required by the automation process (e.g. giant machines for "reading" and routing mail pieces were located at a central hub and the mail had to be taken there to be processed), our concept allows the natural flow of that process to be restored. In other words, there exists a natural manual process flow. Put another way, our concept allows one to separate process automation from process optimization and allows both to take place independently and optimally.

In particular, this concept enables the transformation of a hub-and-spoke process into a linear or a mesh process where the latter are more natural for the process. The routing of a package from point of pickup to a delivery point "next door" (discussed above) is an example of this. By capturing the delivery information at the point of pickup, it is no longer necessary to take the package to a central hub for that processing, only to have to bring it right back again. These changes can realize huge gains in reducing delay and expense, and energy savings.

Optimal Location of Process Components

In some embodiments, providing a mobile capture device with access to recognition and other software, enables a process that has multiple components required for carrying out one or several tasks. Some parts of that process are natural for doing at a particular place in the flow (e.g. where you read an identifier tag, such as an RFID tag, in the field or where a person drops off a package at a kiosk, the natural place for data capture is in the field), while other parts of the process are more naturally located elsewhere (e.g. a centralized database containing information on RFID tags).

In the following section, we discuss a "back-end" (i.e., not "in the field") database but by "database" we mean any process that is remote from the in-field device. Our concept covers the separation of process components that naturally occur in the field from process components that take place in one or more additional locations. It does so in two different ways, which can overlap:

a. Our concept, in an embodiment, envisions processing an object in a cascade process of two or more steps. The first step involves an "in the field" capture of data about the object and the second (and possible additional) processes transmits the information so collected to a database (or databases) that cannot be localized at the capture point and hence must be located elsewhere.

This process may be as simple as a single database access or it may be a cascade process where multiple processes are employed in sequence or in parallel to complete the required task.

"Located elsewhere" includes both databases and other processes that must be located at a central location and databases and other processes that are located at multiple different locations. This inability to localize the database may be for several reasons:
   i. Proprietary control of the database that prevents release into the field.
   ii. The database won't fit on the capture device—in other words, the data is required for the capture process but its being local is prohibited by the capacity of the device.
   iii. The database needs constant updating that is easier to achieve if the database is kept in one place (i.e. the database is dynamic on a time scale too short for reasonable remote updating).
   iv. The data access may be too process intensive for the device (even if the data in it is not too large to fit). This can happen when, for example, a manual stage must intervene in the event of imperfect capture of the data. This patent should cover the case where the "centralized" part of the process is manual.
   v. The database or other back-end process naturally occurs in multiple locations (see, for example, the second half of this patent) and hence cannot be localized completely at all.
   vi. It may simply be too expensive (due to licensing fees or other considerations) to have a version of a database on each in-field device.

b. In another embodiment, there is a unified capture process but a diverse next phase of the process. This is most obvious where data is captured at a single point, but that data will be used in many different processes which may be located in multiple locations, require multiple and scattered databases, or simply have multiple different purposes. An example is provided below entitled "LTL Trucking Example".

c. Another example of this involves an invoice. The "field" location is the point of receipt of a shipment of parts on the loading dock of a company. The incoming invoice/bill of lading is scanned by an in-field device where the image of the form is captured and at least part of it recognized. On the invoice is data needed by several disparate processes including instructions on who gets the arriving package, how to update the inventory control system to account for its contents, the shipper, the billing information and so on.

d. The databases, in both cases, may be accessible OTA (Over the Air) or by other link by the mobile/kiosk device and, say, labels created at that point, or the information captured may be passed on to other systems with no further involvement of the capture device and no further connection (at least for some of them) with the item being processed (the item doesn't need to go to the station doing bill paying, for example).

Less than TruckLoad (LTL) Application

A typical example of utilizing mobile data capture as an input to multiple backend processes is the LTL trucking example. A driver picks up a partial load (e.g. a pallet) for delivery. Using a mobile device, he captures an image of the entire bill of lading. This image then feeds into the following processes, many of which could run either on the device or on a backend system:
1. Address recognition: delivery destination address is recognized for route planning and optimization.
2. Billing information: delivery data (package count, size, weight, etc.) is combined with destination information (if necessary) to initiate the billing process for transportation services, expediting revenue acceptance.
3. Content identification sticker: delivery content information is transmitted to an inventory tracking database to update availability of transported cargo (i.e. no longer available at site A, available at site B on date of delivery).
4. Legal/archival: an image of the bill of lading can be archived. If necessary, this image (including things like shipper signature, hand-written delivery instructions, etc.) can be made available in the event of legal issues.
5. Delivery notification: allow or expedite recipient notification of expected delivery date/time.

Courier, Express, and Postal Applications

In some embodiments, products may be provided to support the industrial mobile recognition markets. These markets include familiar mail and parcel delivery lines of business but also new areas including forms recognition and revenue acceleration capabilities. Existing software products, for example recognition products and related databases, may be ported to mobile devices and Over The Air (OTA) configurations. In the mobile software, the recognition systems may expose webservice interfaces. Mobile line-of-business (LOB) application providers can access recognition capabilties either native on the mobile device operating system or OTA transparently depending on system configuration.

The mobile recognition software, and associated databases (for example, a "database of valid results"—further described below)—will produce technology that enable mobile devices (computers, laptops, handhelds, smartphones, etc.) to read and recognize text and image information collected from on board imaging systems. In one application, a proposed product suite will provide value to mobile LOB applications by reading and validating address and forms information. In many cases these features will reduce the cost of data entry time and errors. In other cases, these capabilties will accelerate the collection of revenue by recognising, recording and transmitting delivery or pick up confirmation information.

TABLE

Representative Problems and Solutions

| | |
|---|---|
| The Problem of | UAA letter and parcel addressing |
| Affects | This affects the letter or parcel delivery agency where costs are increased and/or revenue delayed due to faulty information |

TABLE-continued

Representative Problems and Solutions

| | |
|---|---|
| The impact of which is | The impact of the problem is lost or delayed revenue and/or increased cost due to unanticipated additional handling or processing of articles. |
| A successful solution would be | A solution would be the automated recognition and validation of address information at the point of induction and delivery. |
| The Problem of Affects | Bill of lading recognition and confirmation of delivery This affects the cargo delivery agency. |
| The impact of which is | The impact of the problem is delayed revenue and/or increased cost due to time lapse between courier execution or receiver confirmation and data entry to billing system |
| A successful solution would be | A solution would be the automated recognition and validation of bill of lading information and imaging of receiver acknowledgement (signature). This information and potentially GPS coordinate data on point of delivery would be transmitted OTA to back office billing systems for immediate invoicing where this process would previously be delayed by hours or days while information traveled back to office overland. |
| The Problem of Affects | Inventory management Supply chain management |
| The impact of which is | increased cost of inventory reconciliation and management or lost revenue |
| A successful solution would be | A forms recognition solution coupling text recognition, barcode and potentially RFID and GPS data to quantify supply inventory. A mobilized recognition system could be used to identify and quantify supplies and their location within a supply chain. |

Figure 2:
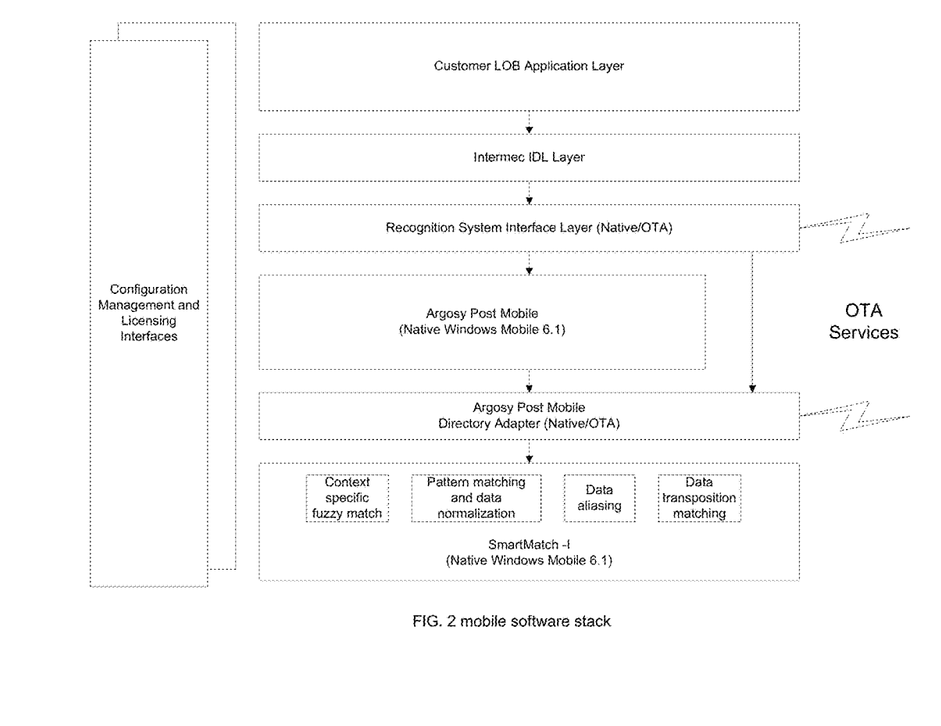
FIG. 2 is a simplified block diagram of an illustrative mobile software component stack.
Figure 3:
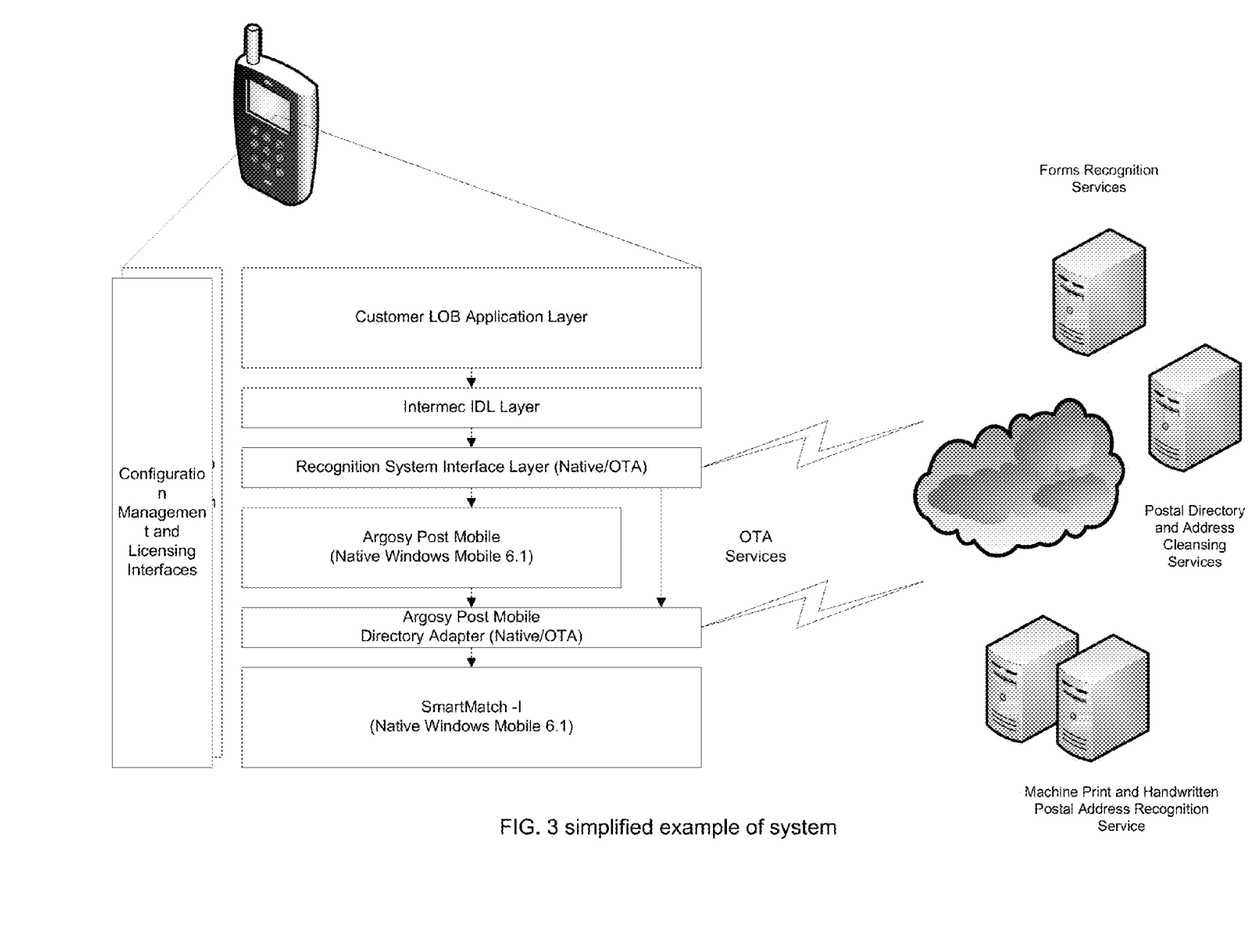
FIG. 3 is a simplified diagram of one example of a system in accordance with the disclosure.

FIG. 2 is a simplified block diagram of an illustrative mobile software component stack. FIG. 3 depicts a sample arrangement of the mobilized and fixed deployment components of a system consistent with the present disclosure, in which a mobile or kiosk device includes a software stack of the type illustrated in FIG. 2. These components include the OCR and Directory in a native implementation installed on the mobile devices, but also an OTA service configuration.

This architecture provides a flexibility where native and OTA hosted processes can be mixed to meet a range of solution constraints. Examples of these constraints include geographic regions where wireless network connectivity is limited. In this case, native application functionality is desired since OTA sited systems will be unreachable. Conversely, OTA configurations are desirable where network availability is high and/or mobile device capabilities are constrained. In these cases, a thin client requiring minimal resources could be installed on the mobile computer which accesses recognition and validation features over the wireless data network.

Figure 4:
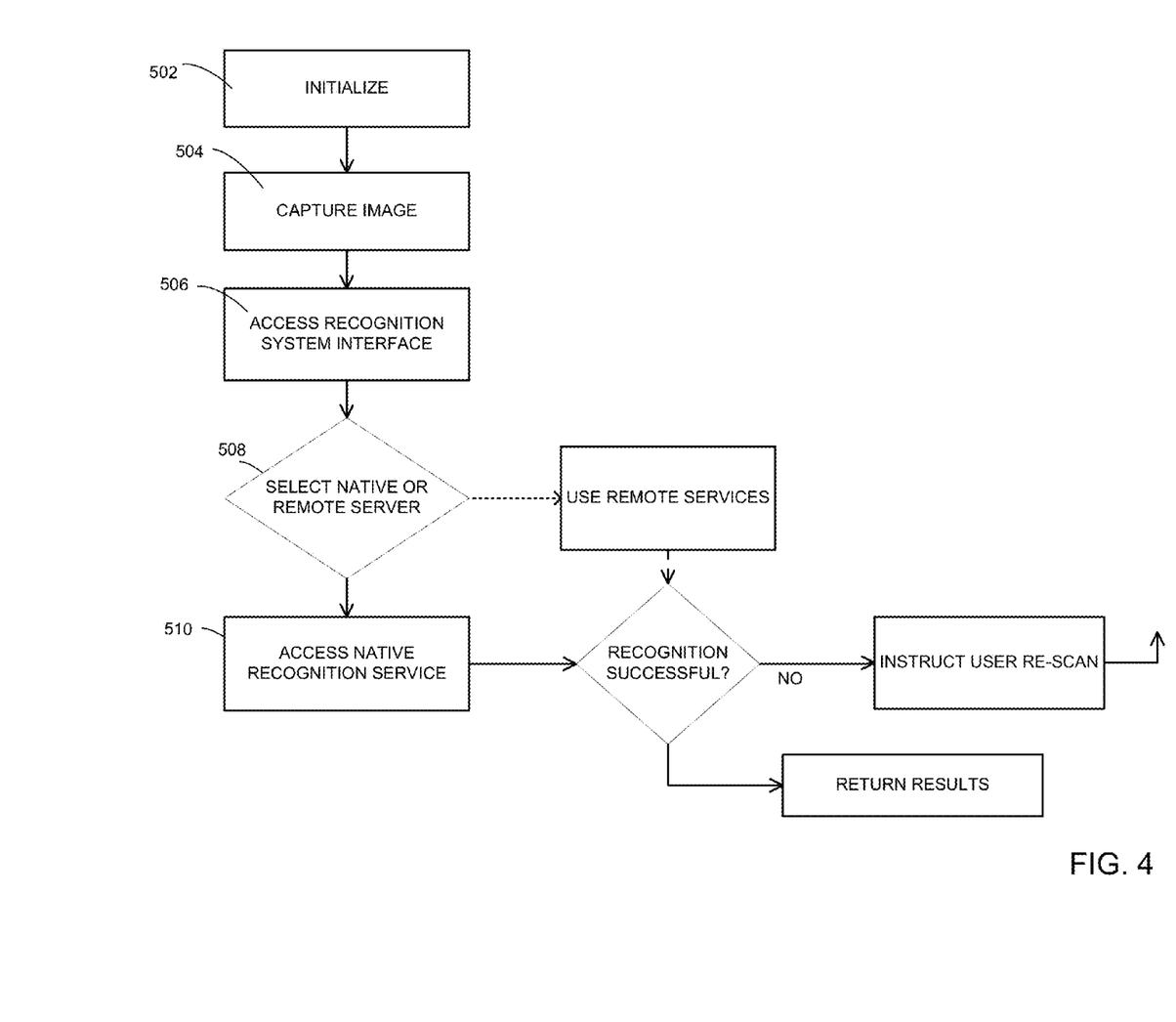
FIG. 4 is a simplified example of a flow diagram illustrating operation of an in-field device.

FIG. 4 is a simplified example of a flow diagram illustrating operation of a mobile or in-field device. Here, following image capture (on the mobile device), the recognition system selects whether to use native resources (recognition software), or employ recognition services on a remote server. However, this is preferably not an either-or (mutually exclusive) determination. Rather, as discussed later, the mobile device in some embodiments may use no remote services, or some of them, or essentially all of them, depending on the circumstances and the need. For example, local (native) recognition may be sufficient for many images, but remote server assistance (a more robust recognition process) may be needed for some other images.

Figure 5:
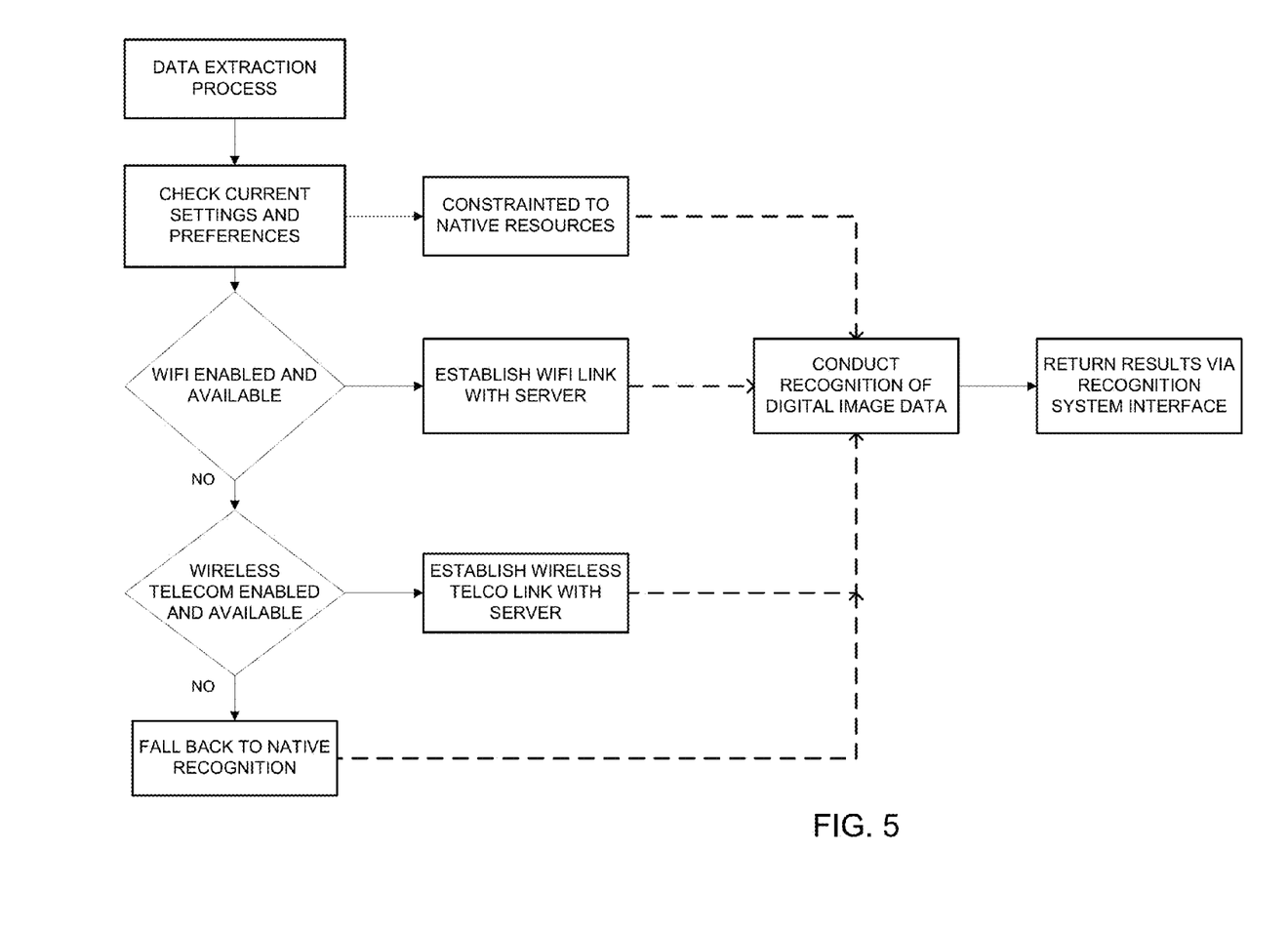
FIG. 5 is a flow diagram that illustrates the concept of the mobile device conducting recognition of digital image data using native resources, over a WiFi link, or via a wireless telecom network connection to a recognition system interface on a remote server.

FIG. 5 is a flow diagram that illustrates the concept of the mobile device conducting recognition of digital image data using native resources, over a WiFi link, or via a wireless telecom network connection to a recognition system interface on a remote server. Any available communications resource may be used.

Examples User Environment

The user environment of the mobile unit preferably includes integrated line of business applications in the shipping, supply chain management, inventory management and related industries. It is envisioned that mobile machine based recognition and data validation technologies will improve cost control and revenue acceleration for these established industries.

In one embodiment, a mobile unit in accordance with the disclosure comprises a ruggedized mobile computer. For example, such devices are commercially available from Intermec Corporation, including without limitation the following models:

CN3—Windows mobile v5.0 and v6.1

CN4—Windows mobile v6.1

CN50—small and large memory configuration, Windows mobile v 6.1 (v7 IIEGH)

Functional Objectives

Preferably the recognition software mobile application stack will be accessible to use LOB application developers via the mobile hardware platform IDL or API's. In one example, RAF Technology's Argosy Post® Mobile API will be exposed via a data collection resource kit.

Port OCR and Directory

In an embodiment, RAF Technology, Inc.'s existing line of industry leading Argosy Post OCR and SmartMatch Directory products may be ported to Windows Mobile or some other mobile environment.

Integrate on-Board Systems

In some embodiments, the mobile software environment may integrate with various onboard interfaces including scanners, cameras, framers, push buttons, etc. Thus, for example, an OCR application receives digital image data from an on-board (or connected) digital camera. Preferably, an interface layer and components virtualize the OCR and directory components.

"Fast Scan" Option

In some embodiments, a mobile device with a scanner (on board or connected) may be configured to scan one image after another as fast as the scanner works. The mobile device recognizes what it can, and queues up the remaining images for either rescan or manual processing. In an embodiment, the flow of image data and recognition results may be managed using a queue or buffer. Thus a mobile device for OCR may appear to the user to be as fast as say, a barcode scanner, when in fact it is not.

E-Citation Applications

Currently many municipalities are experiencing budget deficits and are facing pressure to maximize fund collections by issuing fines for moving, parking and local ordinance violations. In addition, both government and private companies want to control the flow of vehicles in many applications, including automatic toll collection, structure access, and vehicle tracing and tracking.

For motorcycle, bicycle, and foot patrol law enforcement officers, each time they leave their vehicle puts these field workers at a higher risk. Each minute spent on the side of the road increases exposure to a law violator or to the risk of being hit by traffic. The kind of interaction that takes place between the police and possible violators is of three kinds: determining who the policeman is dealing with, determining whether there is a possible infraction, and then if there is, dealing with the driver.

Our mobile device is mounted on the patrol car or motor cycle (it can be hooked into the camera on the front of patrol cars or motorcycle) or hand-held for, for example, foot patrolmen) and so aimed that it finds and reads the license plate of any car that comes within its sight. Through its connection to a database it determines whether the car is of interest (or the policeman assert interest because, for example, the car was speeding) and if it is of interest, provides the proper information to the policeman, which can include but is not limited to what the infraction is, who is the owner of record, what other information is available about the owner, any safety concerns, and so on. Our system thus allows two of the three forms of interaction to be dealt with while the patrolman is still in his vehicle, thus reducing danger and interaction time. In addition, the system that includes our mobile technology can provide considerable information to the policeman on potential drivers, enabling him to take appropriate precautions in approaching the vehicle.

Beyond that, it may provide two additional pieces of information: it may indicate the vehicle is not of interest, thus saving the time (and reducing the risk) of the patrolman interacting with the driver and it may indicate that a vehicle that comes within view of the camera is of interest even though the attention of the policeman was not specifically directed at that vehicle. This, of course, is particularly relevant to car- or motorcycle-mounted devices that read whatever license plates they seen.

This ability to enhance the "attention" of the patrolman is one of the enhancements our mobile technology makes possible since without 1) finding the license plate, 2) reading the license plate, and 3) connecting to back-end databases (all of which our system does) required the policeman to first determine he should be interested in the vehicle and then enter all the information into the system himself.

In addition to ameliorating safety concerns, allowing early dismissal of possible interactions, and bringing otherwise-unnoticed vehicles to the attention of authorities, the mobile system makes possible far more accurate data capture in the even contact is made with the vehicle and its driver. Under most current situations, the policeman fills out a citation by hand (even in the most automated systems he still manually enters the information into the system) and then, later, someone (who may or may not be the original policeman) manually reenters that data into the electronic system.

Data entry errors are inherent with pen/paper citations despite an officer's best effort to reduce mistakes such as incomplete, transposed, or incorrect information. Compounding the issue further, paper citations introduce additional errors during back-office processing, increasing the risk of citation dismissals.

Our solution to this problem automates the citation process by using mobile computers running sophisticated mobile data extraction and verification software, including connection to databases and other back-end systems and an in-car printer, enabling the citation to be issued in exactly the same form in which the system holds the information. The effective e-Citation system we propose cuts the time to issue citations dramatically, reduces the need for many interactions with the driver, enables vehicles not noticed by the policeman to be examined automatically, and provides the officer with information on the vehicle and its potential drivers that may enhance his safety. It automatically captures critical vehicle and license information using automatic identification and data capture technology such as optical character recognition (OCR) and real-time database access, aggregates information such as location, time, driver's license number, VIN, and license plate, associates that information with data obtained from a database (associated this time with the back-end system), and takes the action required by the system of which our device is a part, such as printing a citation, allowing vehicle access, and so on.

The benefit of embedding OCR technology on a mobile computer is that allows an officer to scan a vehicle license plate and acquire information on the vehicle (and presumptive driver) without making contact or even getting out of the vehicle. It also provides the ability to read more than just the license plate, including vehicle identification number and the violator's driver's license and associate those items in a database, use them to obtain additional information on the violator or the vehicle, and so on. Once this information is automatically captured & verified, real-time information can be provided to an officer which includes notification of outstanding arrest warrants, identification of a stolen vehicle, or falsified license and vehicle owner information. Backup information can be simultaneously provided to headquarters and to other patrol cars nearby, in the event of trouble.

All this information can be quickly collected by a handheld or vehicle-mounted mobile computer which leaves the officers other hand free to perform additional critical tasks (which may involve holding his weapon). All of the above is referenced to an automobile, but our system can be used for trucks, motorcycles and other road vehicles as well as boats and other means of transportation.

Within view of this patent is the ability to use a mobile or kiosk-based device to capture identifying information for travelers for the benefit of TSA or other authorities. Right now, when you as a traveler present TSA with your driver's license, all the TSA agent really knows is that he has a piece of plastic with your picture on it that fluoresces. We present a hand-held device that detects the fluorescence and also captures all the information on the license whether photographic, printed, barcoded, or in a magnetic strip, sending that information to local or remote databases for confirmation that the picture goes with the other data, that the person is allowed to fly, that there is no other reason to detain them, and a myriad of other purposes. Once again, the flow of the traveler is pre-determined by the way security and airports are run. We inject technology into existing flows without appreciably modifying those flows but enabling earlier, better, cheaper, or safer data capture and further processing of the item or person.

Technology Flow

In one example, an image of the license plate is captured by a mobile device, video camera in police car, camera at the entry point into secure facility, etc. An OCR application recognizes the characters on the license plate, driver's license, VIN number and so on. The OCR results are looked up in one or more existing databases—list of license plates issued by a state, list of stolen vehicles, list of vehicles allowed access into a secure facility, etc.—and the lookup results are displayed along with (if necessary or appropriate) any information available on the vehicle or presumptive driver. In the case of a traffic stop, an image of the driver's license can be captured and OCR performed to induct the license into the system. The OCR results are looked up in one or more existing databases—licensed drivers within a state, list of people with outstanding warrants, etc.—and the lookup results retrieved and displayed. The information collected and collated by the mobile device can be stored in yet another database. Any of the accessed databases can be local to the mobile device or on a central server (accessed via a mobile phone, radio, WiFi network or any other method).

Many applications such as the one discussed here will also allow manual entry of the data for those cases where the license plate etc. might be obscured, in too dim light, or otherwise not able to be read by the mobile device. All the rest of the system will function as described.

Remote Deposit Capture (RDC) for Checks Applications

According to a 2011 AlixPartners study, a high level of mobile RDC check migration is expected by 2016. 2.1 billion checks are projected to migrate to mobile RDC from other channels, with mobile RDC adopters depositing 73% of their paper checks via mobile RDC. For many businesses, particularly in direct store delivery, customers paying by check account to 20% or more of their daily customer transactions. Being able to capture the information on those checks and process them directly in the normal course of a transaction (rather than later at a bank, for example) is a major improvement given by our system's capabilities.

Given the ongoing demand to improve a corporation's cash flow, substantial benefits can be realized by using a Remote Deposit Capture solution in a corporation as both the remittance processing and financial transaction processing platform. "Check 21" legislation and technology enhancements allow for the convergence of these traditionally separate functions (Remittance Processing & Treasury Deposit Functions). The Check 21 federal law allows checks to be cleared off of a copy—including a digital electronic copy—of the original check.

Using Optical Character recognition software (OCR) operating locally on a mobile device can substantially reduce the number of keystrokes required for entering both the legal and courtesy amounts and for capturing the personal information on the check such as name, address, bank routing number, bank account number, and check number.

Enhancing the service through the use of intelligent character and document recognition (ICR) can further automate the process by automatically reading data on control documents such as invoices or bills of lading and intelligently comparing the information so captured for use within some back-end system.

Our system goes beyond just capturing, say, the courtesy amount on a check (the numbers usually in a box). We extend the capture and processing capability to automate image and data capture of non-check items such as payment coupons, purchase orders or invoices as part of a single capture act. In addition we capture and integrate personal information such as name, address, bank account number and so on from the check. Beyond automating the capture of information, the solutions can produce file extracts to facilitate electronic consolidation of receivables data—thus eliminating the requirement to transport these documents to a central site for processing. This is an example of using the capability of on-site capture to improve the workflow of an organization (more about which later). Providing technology to field-process and dispose of these items is a major benefit of our invention.

Technology Flow

An image of the document (check, coupon, invoice, etc.) is captured by a mobile or Point of Sale (POS) device. An OCR/ICR application automatically detects the document type and recognizes the appropriate information (e.g. check MICR line and amount, coupon value, or invoice line items). The application transmits the image of the document and recognition results to a backend system. Once the back-end system acknowledges data receipt and induction, the paper document can then be destroyed. All captured information is integrated and cross-checked and the results sent to real-time and archival systems for appropriate use.

Intelligent Embedded Devices Applications

There are a great many places where workflows today transport information that could be used elsewhere or that could be provided earlier so as to enable better use of the information, but where this information is not captured because it is not sufficiently valuable to interrupt the process flow to acquire it. The mobile capability of the our system means that it can be embedded in objects that already handle data and in being embedded greatly enhance the data that can be captured from the item and what can then be done with it.

Next I will use the example of an intelligent copier or fax machine, but it is intended that any ability to take data capture, database access, and intelligent back-end connectivity to the field for use in an already-existing processes and workflows is implied.

Examples above dealt with the case where the item to be captured was a vehicle license, driver's license, meter, or check or supporting document. In those examples the item read was generally not specifically a "document" and the reason for capturing it often had nothing to do with the item itself but was intended to give insight into something else: the advisability of letting a traveler on an airplane, whether a particular vehicle should be allowed into a parking structure, whether a vehicle was stolen or its presumptive driver wanted for criminal activity, how much electricity a customer is using.

This section addresses a more "office" or "warehouse" type of environment where the items read are somewhat more "document" like. The idea, however, of injecting capture technology into an already-existing flow to enable more to be done with that flow or that information, remains.

A fax machine may be used to transmit the image of an order form to a business. An intelligent fax machine with our embedded technology can capture the information on that form, enter the results into a SAP system or even determine to whom it should be faxed. It could email the information to the intended recipient and just send the original image as backup, for example. Incoming documents can be captured upon opening the envelope and the system determine what to do with them automatically, whether for routing to the appropriate person, filing, destroying, or placing an order or filing a complaint.

A further example of this consists of what to do with a package that comes into a mail room or to a loading dock. In the mail room, our system can capture information on or associated with the item (the recipient's address or mail stop for an incoming package, for example). But rather than just telling the mail room workers where to take the package—useful in its own right—it can also check a database of expected receipts (after reading the return address or some serial number or bar code on the package) and send the package not to the nominal addressee but to where it is actually needed in the corporate work flow. It can also highlight suspicious packages that do not appear to conform to standard items received by the enterprise.

In the warehouse example, identifying data on the package can be captured, paired with a previous order and an incoming invoice, all that data entered into an internal tracking system and the warehouse worker told which shelf on which to place the package—all without any more intervention that using the mobile device to scan the item and associated documentation.

Technology Flow

In each of these cases (indeed, in many of the cases covered in this paper), there is an existing flow of people, automobiles, packages, documents, and so on. In this particular case an item is going through the workflow for one purpose—receipt at the loading dock, faxing to a recipient, receipt in the mail room—and using our in-the-field data capture and processing capability, additional information can be captured, compared with many different kinds of databases, and the item or information about the item routed appropriately and automatically.

Each approach outlined here has a similar flow, so the case of loading dock receipt is enough to show the technology flow. A package arrives on the loading dock with associated paperwork. Rather than routing the package one place and each document someplace else, all are scanned with an embodiment of our system. The package enters into inventory control, a database is searched for where the contents of the package are to be stored, the proper people within the company are notified, the invoice is sent to Payments, and everything else now knowable about the item sent to the appropriate person immediately upon receipt. Our capability is to capture data, recognize it, contact one set of databases to determine what it should say, aggregate information from multiple items (e.g. package and billing invoice), contact additional databases for information on what to do with the item and associated data, and provide all this information to the appropriate people—all without materially changing the flow of the package or its associated information except to make the whole flow more immediate: at the point of first contact, more accurate, and more efficient.

Workflow Optimization Applications

In the proceeding we have stressed that our system enables in-the-field capture of information in a way that does not interfere with the natural flow of the item but that enables considerably more to be done considerably earlier. This section notes one major thing that "can be done" with the information whose capture our system makes possible.

We have looked extensively at using our system to provide an entity with the information necessary to more efficiently transport an item to its final destination. We hinted at this capability in the loading dock example earlier. In this section we look more explicitly at the capabilities provided by our system for optimizing a transshipment operation such as FedEx. Although what follows will concentrate on one particular application (we are engaged in sales efforts for the mobile device with FedEx at the current time), it is meant to apply broadly.

FedEx collects parcels, packages, and overnight letters from companies and individuals. Approximately 80% of the time the destination and tracking information about that item is already in the FedEx system, since it was so entered by the shipper. About 20% of the time (more in some places, less in others), however, that information is not entered. Two common causes of this are small enterprises or individuals who are not electronically connected to the FedEx system, and enterprises of all size that have "just one more" item to hand the person making the pickup.

Today, all items (those already inducted into the FedEx system and those not) are shipped to a centralized point where the items that have not been inducted have their information manually entered into the FedEx system. This is the first time the electronic FedEx system has seen the item. In addition, for those items already in the system, when they are scanned at the aggregation point is often the first time the FedEx system knows an expected item has actually been physically presented to them.

Essentially, therefore, the system knows nothing about 20% of the items arriving at the aggregation point and has only partial information about the remaining 80%. In addition to this, approximately 5% of the data already entered in the system is wrong (and a higher percentage of the items that haven't been entered). The error is very often in the delivery address, which means the shipper has to be called or the item returned for better addressing.

With our system, the driver can confirm all delivery addresses at the point of pickup and electronically induct all packages into the FedEx system at the point of first contact. This, in general, gives FedEx an additional half day to figure out what to do with the item. Because all the information is captured, including item weight and type (e.g. letter, parcel, package), truck and airplane use can now be scheduled in advance since, because of the RAF system, how much is going where is known hours before it arrives at the aggregation point. In addition to the above, the RAF system can allow dimensioning of the package so that its physical size can be known to the system prior to arrival at the aggregation facility. This additional information further narrows the uncertainty of how many transportation vehicles will be needed to go where.

Technology Flow (Described in the Main Text Immediately Above)

FIRST EXAMPLE SYSTEMS, METHODS, AND APPARATUSES

In an example, a system is provided. The system may include a server equipped for wireless data communication with a remote mobile unit; and a mobile unit equipped for wireless data communication with a server; the mobile unit including—an image capture unit to provide a digital image of a parcel; and a digital processor arranged for executing software code stored in the mobile unit responsive to the digital image; the stored software code including—a customer application layer, a recognition system interface component, and a directory adapter component configured to provide directory services to the recognition system interface component to verify, complete or correct preliminary destination address data.

In an example, the system includes a native address data extraction component stored in the mobile unit; and wherein the recognition system interface component is configured to interact with the native address data extraction component to generate preliminary address data; and the recognition system interface component is configured to interact with the directory adapter to verify or correct the preliminary address data and return verified or corrected address data to the customer application layer or user interface.

In an example of the system, the recognition system interface component includes an interface for wireless communication with the server, and the server is configured to provide remote recognition services to the mobile unit via the recognition system interface component. The remote recognition services available in the server may include at least one of machine print and handwritten postal address recognition services. The remote recognition services available in the server include forms recognition services.

In an example of the system, the digital image comprises a bar code on the parcel or mail piece.

In an example of the system, the mobile unit further includes a local directory database [Smart Match-i] configured to interact with the directory adapter component to provide directory services.

In an example of the system, the directory adapter component includes an interface for wireless communication with the server, and the server is configured to provide remote services to the mobile unit via the directory adapter component. The remote directory services available in the server may include forms recognition services. The remote recognition services available in the server may include postal directory services. The remote recognition services available in the server may include postal address cleansing or NCOA services.

In an example of the system, the mobile unit further includes a local directory database configured to interact with the directory adapter component to provide directory services; and further includes a native address data extraction component stored in the mobile unit; and wherein the recognition system interface component is configured to interact with the native address data extraction component to generate preliminary address data; and the recognition system interface component is further configured to interact with the directory adapter to verify or correct the preliminary address data and return verified or corrected address data to the customer application layer or user interface.

In an example, a server is provided. The server includes a processor and stores software components in memory for execution in the processor, the stored software components including: a communication component for wireless data communication with a remote mobile unit; a recognition component to provide remote address recognition services to the mobile unit; and a directory services component to provide remote directory services to the mobile unit.

In an example of the server, the address recognition services include machine print address recognition services. The address recognition services may include hand written address recognition services. The address recognition services may include other recognition services.

In an example of the server, the remote directory services include postal directory and address cleansing services.

In another example, a method is provided. The method includes in a hand-held mobile unit, capturing a digital image of a portion of a parcel or mail piece; in the mobile unit, processing the captured digital image to extract preliminary address data; in the mobile unit, processing the preliminary address data to form verified or corrected address data; and associating the parcel or mail piece with the verified or corrected address data prior to submitting the parcel or mail piece to an automated routing system, thereby insuring that correct destination data is associated with the parcel or mail piece before attempting automated routing.

In an example, the method includes wirelessly communicating with a remote server for processing the captured digital image to extract preliminary address data.

In an example, the method includes wirelessly communicating with a remote server for processing the preliminary address data to form verified or corrected address data.

In an example, the method includes wirelessly communicating with a remote server for downloading GPS location data associated with the verified or corrected address data.

In an example, the method includes printing the corrected address data on a new label and adhering the new label to the parcel or mail piece.

Some of the above numbered examples in paragraphs 0045-0060 are narrower or more specific than the full scope of the present disclosure. For example, the present disclosure applies to virtually ANY automated recognition process, not merely address recognition. Some examples of other recognition processes, say recognizing passports or field service tags, are identified in the "Second example systems, methods, and apparatuses" below.

In general, many recognition processes require a corresponding database of allowed (or valid) results. Such a database may be part of a back-end system. A recognition process may query the back-end system, for example sending it incomplete or "proposed" recognition data, and receive back more complete or corrected recognition results. It also may receive data associated with the recognition results. As discussed above, a postal address "directory" is just one example of a database of allowed (or valid) results. Other examples are shown in the Second example systems, methods, and apparatuses below, but these too are merely illustrative and not intended to be limiting.

In other embodiments, an item has an RFID tag and there exists a database connecting that ID tag to a set of operations or procedures to do with the item. This should work both for native and over the air processing. Information may be captured (e.g. from a document), and combined with the information already in the RFID database. The resulting information may be used modify the downstream processing of the item. This can also be done with tracking barcodes on the item as well as with RFID chips or any other on-object identifier of the object.

There are two main implementations of the claimed system, but these are not exclusive or exhaustive. One has native processing for the components (e.g. machine print, handwriting, directory), and the other has over the air (OTA) connection to a server where some of those processes are carried out. Preferably, there is a continuum from everything is native to the device and there is no connection to the outside world (read an address, print a routing barcode with the recognition and directory both native and the printer for the routing barcode label connected physically to the mobile device), all the way to where the mobile device captures the image and does nothing else, with all the components resident on the server. Our concept covers the whole continuum, and it is important that there IS a continuum—it isn't just native or over the air (OTA) for the whole thing. Various components can be native and others accessible on the server. In this broader light, a second example of systems, methods, and apparatuses follows. Again, these are not intended to be limiting, but they provide further examples of embodiments and features of the present disclosure.

SECOND EXAMPLE SYSTEMS, METHODS, AND APPARATUSES

In an example, a system is provided. The system includes a portable, in-field unit including: an RFID tag reader to acquire an ID tag identifier from an RFID tag located in or on a physical item positioned within functional range of the in-field unit RFID tag reader; a digital processor arranged for executing software code stored in the in-field unit responsive to the acquired ID tag identifier, the stored software code including—a customer application layer; and a database adapter component configured to provide database services to the processor; wherein the database services include accessing a stored database to acquire stored data associated with the acquired ID tag identifier.

In an example, the stored database is stored in the in-field unit.

In an example, the stored database is accessed via wireless communication with a remote server.

In an example, the stored database contains a set of operations or procedures associated with or indexed to each ID tag identifier.

In an example, the software code executable on the in-field unit is operable to return to the customer application layer the stored set of operations associated with the acquired ID tag identifier.

In an example, the software code executable on the in-field unit is operable to mark (label) the physical item responsive to the stored set of operations associated with the acquired ID tag identifier.

In an example, the software code executable on the in-field unit is operable to electronically send a message to a predetermined recipient responsive to the ID tag identifier.

In an example, a method is provided. The method includes capturing a digital image in an in-field device of an optical identifier visible on a physical item positioned proximate to the in-field device; recognizing information in the captured digital image to determine a recognition result; and transmitting the recognition result to a backend system remote from the in-field device, wherein the backend system is configured to take a predetermined action or provide data responsive to receiving the recognition result.

In an example, the recognizing step is carried out independently in the in-field device.

In an example, the recognizing step is carried out in the in-field device with support from a remote server. The method may include sending preliminary recognition data from the in-field device to the remote server, and receiving recognition results from the remote server. The method may include accessing a database of valid results in support of the recognition step, the database of valid results accessible to either the in-field device or the remote server.

In an example, the recognizing step comprises sending the captured digital image to a remote server, and receiving a recognition result from the remote server.

In an example, the backend system is coupled to the in-field device.

In an example, the backend system is coupled to the remote server.

In an example, said recognizing step utilizes at least one selected recognition software component that is native in the in-field device, and also utilizes at least one other recognition software component that is deployed on the remote server. The method may include selecting at least one native recognition component when communication with the remote server is not available.

In any of the example methods, the recognizing step comprises recognizing identifier data from digital images of at least one of—mail pieces and packages, passports, drivers licenses, ID cards, vehicle license plates, part IDs, object IDs, field service tags, machinery IDs, and package IDs.

In any of the example methods, the backend system comprises a database of records that reflect at least one of—a terrorist watch list, list of outstanding arrest warrants, Amber alerts, list of traffic violations, license suspensions, postal system destination addresses, equipment identification and associated databases for field service, and allowed-access databases, for accessing a gate, door or other physical access portal. In an example, the backend system transmits a message responsive to receiving the recognition result.

In an example, a method is provided. The method includes, in an in-field device, capturing an identifier of a nearby physical object from an on-object identifier, wherein the identifier is associated with a record in a predetermined database; in the in-field device, capturing information from a document; combining the captured information with existing information in the said database record to form a result; and applying the result to modify subsequent processing of the item. The on-object identifier may comprise an RFID device. The on-object identifier may comprise a barcode.

In an example, an apparatus is provided. The apparatus may include an image capture unit to provide a digital image of an optical identifier visible on a physical item positioned proximate to an in-field device; and a digital processor arranged for executing software code stored in the in-field device, the stored software code configured to execute a predetermined action associated with the captured digital image.

In an example, the stored software code includes a recognition process for recognizing information visible in the captured digital image, and further implements a linkage to a backend system remote from the in-field device to communicate results of the recognition process to the backend system. The stored software code may implement a recognition process for recognizing handwriting or machine print. The recognition software code may be configured for recognition of identifier data from digital images of at least one of—mail pieces and packages, passports, drivers licenses, ID cards, vehicle license plates, part IDs, object IDs, field service tags, machinery IDs, package IDs. The backend system may return data to the in-field device or takes a predetermined action responsive to the results of the recognition process. The digital processor may be configured to access a database of valid results for use in support of the recognition process, to provide valid results based on proposed results generated by the recognition process. The database of valid results may comprise records that reflect at least one of—a terrorist watch list, list of outstanding arrest warrants, Amber alerts, list of traffic violations, license suspensions, postal system destination addresses, equipment identification and associated databases for field service, and allowed-access databases, for accessing a gate, door or other physical access portal.

The systems, methods, and apparatuses disclosed above may be applied to enable any or all of the following additional concepts.

A. Local correction of addresses: by having address recognition done at point of induction of package into the system (i.e. where it is picked up from the shipper), you have the ability to determine it is undeliverable as addressed and to ask for a corrected address from the people who generated the address in the first place, saving the time of having to send it back later (or calling them later) to get the correct address. Local mobile capture, described above, enables this capability which cannot be done with current devices.

B. Dynamic routing of packages. Induction of packages at point of shipment (rather than at a hub) enables about ½ day extra time for the package to be in the system (the length of time for the pick-up truck to make it back to the hub). This in turn enables the courier to schedule his trucks/airplanes/camels better because he knows sooner what is going where. This can be used with or without the next item, dimensioning. If used with dimensioning, enables not only the number of items going to a destination, but their size to be known a half-day earlier, enabling much better dynamic routing.

C. Dimensioning. A mobile device of the type disclosed above may be configured to determine the size and shape characteristics of a package (as well as capture what is on it). Today, dimensioning can be done on rectangular solids, determining the three primary dimensions. Dimensioning can consist of several things: the smallest rectangular solid that can enclose an object (i.e. what size box would it fit in), the convex hull of the object (i.e. the smallest everywhere convex shape that could contain the object) and, within limitations of visibility of internal voids, the actual volume and shape of the object including holes.

Example

Consider a donut. A first dimensioning step would find the rectangular solid box in which the donut would fit. The second would effectively put flat planes across the hole and return that shape, which would be the size of the object if wrapped in wrapping paper. The third would see the hole and return the exact size and shape of the donut.

In one embodiment, dimensioning may be done in concert with either the package induction (i.e. you capture the delivery address and also the package size/shape) or in concert with dynamic routing (as described above—you know how much room to allocate on the truck going to a particular city half a day earlier) or both.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

A processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example. It will be obvious to those having skill in the art that many changes may be made to the details of the above-described embodiments without departing from the underlying principles of the invention. The scope of the present invention should, therefore, be determined only by the following claims.

The invention claimed is:

1. A method, comprising:
    intercepting a physical item having associated therewith an indicium in the field and capturing an image of the indicium using a portable, mobile instrument;
    at first time, using Optical Character Recognition (OCR), deriving first data from the captured image, wherein the first data comprises an OCR result;
    at a second time that is later than the first time, executing stored instructions using a processing device of the portable, mobile instrument to determine whether to employ a native resource on the portable, mobile instrument to verify or correct said first data;
    in response to a determination to employ a service of a remote server to verify or correct said first data, initiating an attempt to employ the service of the remote server to verify or correct said first data;

in response to a result of said attempt to employ the service of the remote server to verify or correct said first data at a third time that is later than the second time, utilizing said native resource on the portable, mobile instrument to verify or correct said first data, wherein said utilization includes comparing at least one of said first data or preliminary data that is based on the first data to second data stored on a database on the portable, mobile instrument; and storing a result of the comparison in an electronic memory device;

wherein the indicium is associated with a first workflow and the method further comprises ascertaining whether to assign a second workflow that is different than the first workflow to the physical item responsive to the result of the comparison.

2. The method of claim 1, wherein the indicium comprises a machine-readable medium specifying a part identifier.

3. The method of claim 1, wherein the indicium comprises a machine-readable medium specifying contents of the physical item, and wherein the method further comprises:
selecting a storage location for the physical item or the contents from a plurality of storage locations responsive to the result of the comparison.

4. The method of claim 1, further comprising generating at least a portion of a route for the physical item from a current location to a delivery destination responsive to the result of the comparison.

5. The method of claim 4, wherein generating the portion of the route for the physical item from the current location to the delivery destination responsive to the result of the comparison further comprises determining whether to bypass routing of the physical item through an aggregation facility corresponding to a stationary machine responsive to the result of the comparison.

6. The method of claim 1, further comprising generating at least a portion of a route for the physical item from a current location to a delivery destination responsive to the result of the comparison;
wherein the first workflow includes routing the physical item to a stationary machine; and
wherein generating the portion of the route for the physical item from the current location to the delivery destination responsive to the result of the comparison further comprises determining whether to bypass routing of the physical item through an aggregation facility corresponding to the stationary machine responsive to the result of the comparison.

7. The method of claim 1, wherein the method further comprises:
initializing a vehicle scheduling process to select a vehicle for transporting the physical item towards the destination responsive to the result of the comparison.

8. The method of claim 1, wherein the indicium comprises a machine-readable medium.

9. The method of claim 8, wherein the indicium comprises a bar code.

10. A method, comprising:
intercepting a physical item having attached thereto a machine-readable indicium or a human-readable indicium in the field and capturing an image of the machine-readable or human-readable indicium using a portable, mobile instrument;
at first time, using Optical Character Recognition (OCR), deriving first data from the captured image, wherein the first data comprises an OCR result;
at a second time that is later than the first time, executing stored instructions using a processing device of the portable, mobile instrument to determine whether to employ a native resource on the portable, mobile instrument to verify or correct said first data;
in response to a determination to employ a remote service to verify or correct said first data, initiating an attempt to employ the remote service to verify or correct said first data;
in response to a result of said attempt to employ the remote service to verify or correct said first data at a third time that is later than the second time, utilizing said native resource on the portable, mobile instrument to verify or correct said first data, wherein said utilization includes comparing at least one of said first data or preliminary data that is based on the first data to second data accessible by a database adapter component on the portable, mobile instrument;
storing a result of the comparison in an electronic memory device; and
selecting a workflow for the physical item responsive to the result of the comparison.

11. The method of claim 10, wherein the machine-readable or human-readable indicium specifies a part identifier.

12. The method of claim 10, wherein the machine-readable or human-readable indicium specifies contents of the physical item, and wherein the method further comprises:
selecting a storage location for the physical item or the contents from a plurality of storage locations responsive to the result of the comparison.

13. The method of claim 10, further comprising generating at least a portion of a route for the physical item from a current location to a delivery destination responsive to the result of the comparison.

14. The method of claim 10, further comprising determining whether to bypass routing of the physical item through an aggregation facility corresponding to a stationary machine responsive to the result of the comparison.

15. The method of claim 14, wherein generating the portion of the route for the physical item from the current location to the delivery destination responsive to the result of the comparison further comprises determining whether to bypass routing of the physical item through a particular next hop responsive to the result of the comparison.

16. The method of claim 10, wherein the method further comprises:
initializing a vehicle scheduling process to select a vehicle for transporting the physical item towards the destination responsive to the result of the comparison.

17. A memory device having instructions stored thereon that, in response to execution by a processing device of a portable, mobile instrument, cause the processing device to perform operations including:
using Optical Character Recognition (OCR), deriving first data from a locally captured image of a machine-readable or a human-readable indicium of a physical item, wherein the first data comprises an OCR result;
determining whether to employ a native resource on the portable, mobile instrument to verify or correct said first data;
in response to a determination to employ a remote service to verify or correct said first data, initiating an attempt to employ the remote service to verify or correct said first data;
in response to a result of said attempt to employ the remote service to verify or correct said first data, utilizing said native resource on the portable, mobile instrument to verify or correct said first data, wherein said utilization includes comparing at least one of said first data or preliminary data that is based on the first data to second data accessible by a database adapter component on the portable, mobile instrument; and electronically storing a result of the comparison;

wherein the operations further comprise selecting a workflow for the physical item responsive to the result of the comparison.

18. The memory device of claim 17, wherein the machine-readable or human-readable indicium specifies a part identifier.

19. A memory device having instructions stored thereon that, in response to execution by a processing device of a portable, mobile instrument, cause the processing device to perform operations including:

using Optical Character Recognition (OCR), deriving first data from a locally captured image of a machine-readable or a human-readable indicium of a physical item, wherein the first data comprises an OCR result;

determining whether to employ a native resource on the portable, mobile instrument to verify or correct said first data;

in response to a determination to employ a remote service to verify or correct said first data, initiating an attempt to employ the remote service to verify or correct said first data;

in response to a result of said attempt to employ the remote service to verify or correct said first data, utilizing said native resource on the portable, mobile instrument to verify or correct said first data, wherein said utilization includes comparing at least one of said first data or preliminary data that is based on the first data to second data accessible by a database adapter component on the portable, mobile instrument; and electronically storing a result of the comparison;

wherein the machine-readable or human-readable indicium specifies contents of the physical item, and wherein the operations further comprise:

selecting a storage location for the physical item or the contents from a plurality of storage locations responsive to the result of the comparison.

20. A memory device having instructions stored thereon that, in response to execution by a processing device of a portable, mobile instrument, cause the processing device to perform operations including:

using Optical Character Recognition (OCR), deriving first data from a locally captured image of a machine-readable or a human-readable indicium of a physical item, wherein the first data comprises an OCR result;

determining whether to employ a native resource on the portable, mobile instrument to verify or correct said first data;

in response to a determination to employ a remote service to verify or correct said first data, initiating an attempt to employ the remote service to verify or correct said first data;

in response to a result of said attempt to employ the remote service to verify or correct said first data, utilizing said native resource on the portable, mobile instrument to verify or correct said first data, wherein said utilization includes comparing at least one of said first data or preliminary data that is based on the first data to second data accessible by a database adapter component on the portable, mobile instrument; and electronically storing a result of the comparison;

wherein the operations further comprise generating at least a portion of a route for the physical item from a current location to a delivery destination responsive to the result of the comparison.

21. The memory device of claim 20, wherein generating the portion of the route for the physical item from the current location to the delivery destination responsive to the result of the comparison further comprises determining whether to bypass routing of the physical item through an aggregation facility corresponding to the stationary machine responsive to the result of the comparison.

22. The memory device of claim 21, wherein generating the portion of the route for the physical item from the current location to the delivery destination responsive to the result of the comparison further comprises determining whether to bypass routing of the physical item through a particular next hop responsive to the result of the comparison.

23. The memory device of claim 20, wherein the operations further comprise initializing a vehicle scheduling process to select a vehicle for transporting the physical item towards the destination responsive to the result of the comparison.

* * * * *